(12) United States Patent
Takeda

(10) Patent No.: US 7,178,552 B2
(45) Date of Patent: Feb. 20, 2007

(54) VALVE

(75) Inventor: Tomohisa Takeda, Matsuyama (JP)

(73) Assignee: Miura Co., Ltd., Matsuyama (JP)

( * ) Notice: Subject to any disclaimer, the term of this patent is extended or adjusted under 35 U.S.C. 154(b) by 336 days.

(21) Appl. No.: 10/859,973

(22) Filed: Jun. 4, 2004

(65) Prior Publication Data

US 2004/0244840 A1   Dec. 9, 2004

(30) Foreign Application Priority Data

Jun. 5, 2003   (JP) .............................. 2003-161105

(51) Int. Cl.
*F16K 15/06* (2006.01)
(52) U.S. Cl. .................. 137/512; 137/516.27
(58) Field of Classification Search ............... 137/269, 137/271, 512, 516.29, 516.27
See application file for complete search history.

(56) References Cited

U.S. PATENT DOCUMENTS

| | | | |
|---|---|---|---|
| 156,769 A * | 11/1874 | Cameron | 137/512 |
| 173,521 A * | 2/1876 | Warner | 137/512 |
| 1,022,556 A * | 4/1912 | Johnson et al. | 137/512 |
| 1,147,840 A * | 7/1915 | Bowser | 137/512 |
| 1,488,604 A * | 4/1924 | Lawton | 137/512 |
| 1,785,259 A * | 12/1930 | Hickerson | 137/512 |
| 3,029,835 A | 4/1962 | Biello et al. | |
| 3,114,382 A * | 12/1963 | Karshner | 137/512 |
| 3,344,807 A | 10/1967 | Lehrer et al. | |
| 3,424,427 A | 1/1969 | Ruchser | |
| 3,548,868 A | 12/1970 | Mullaney, III | |
| 3,789,297 A | 1/1974 | Frolich | |
| 4,049,017 A | 9/1977 | Jones | |
| 4,637,430 A | 1/1987 | Scheffel et al. | |
| 4,766,930 A | 8/1988 | Patti | |
| 4,922,957 A | 5/1990 | Johnson | |
| 5,193,577 A | 3/1993 | de Koning | |
| 5,226,445 A | 7/1993 | Surjaatmadja | |
| 5,546,981 A | 8/1996 | Li et al. | |
| 5,597,009 A | 1/1997 | Scherrer et al. | |
| 2004/0238042 A1 * | 12/2004 | Takeda | 137/512 |

FOREIGN PATENT DOCUMENTS

| | | |
|---|---|---|
| JP | 7-101066 B2 | 11/1995 |
| JP | 2001-349454 | 12/2001 |

* cited by examiner

*Primary Examiner*—John Rivell
(74) *Attorney, Agent, or Firm*—Birch, Stewart, Kolasch & Birch, LLP

(57) ABSTRACT

A valve includes: a valve casing (1); a valve chamber (4) defined between a fluid inlet (2) and a fluid outlet (3) of the valve casing (1): and a plurality of check valve mechanisms (9) arranged in series within the valve chamber (4), the plurality of check valve mechanisms (9) each including: a valve seat (6) having a valve hole (5) formed therein: and a valve body (8) fixed to a valve shaft (7) and arranged on a fluid outlet (3) side of the valve seat (6), the valve shaft (7) passing through the valve hole (5) of the valve seat (6) and movably supported on a fluid inlet (2) side and the fluid outlet (3) side of the valve seat (6), the valve body (8) being adapted to move away from the valve seat (6) to open the valve hole (5) when applied with a fluid pressure from the fluid inlet (2) side and adapted to move toward and into contact the valve seat (6) to close the valve hole (5) when applied with a fluid pressure from the fluid outlet (3) side. As a result, a valve with a check valve mechanism capable of reliably preventing fluid backflow can be obtained.

8 Claims, 6 Drawing Sheets

F I G. 5
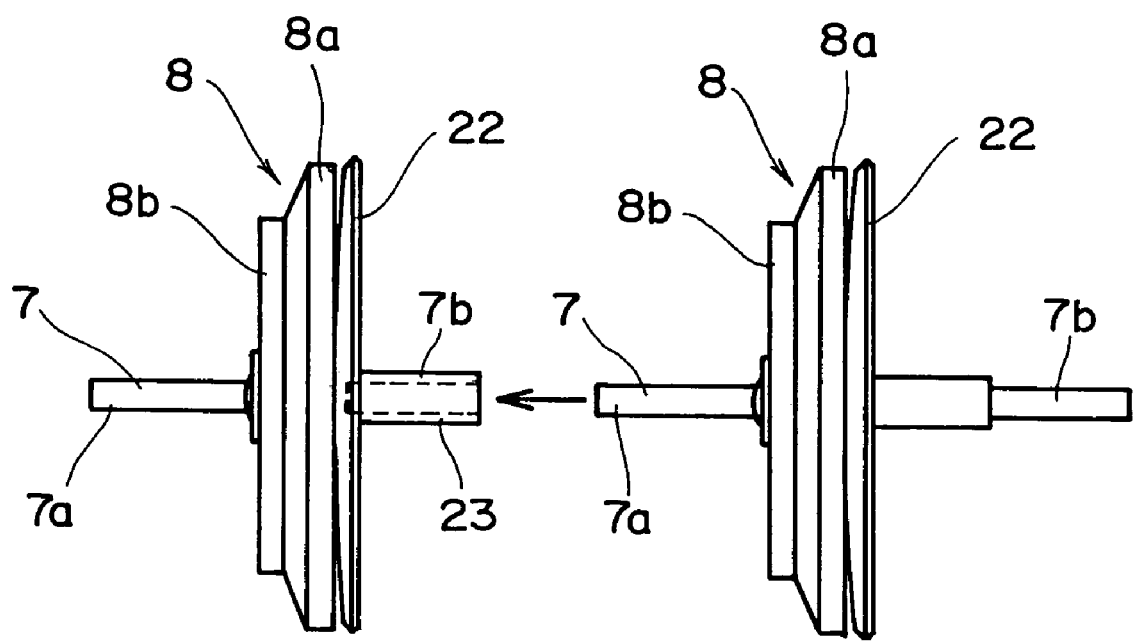

VALVE

This Nonprovisional application claims priority under 35 U.S.C. § 119 (a) on Patent Application No(s). 2003-161105 filed in JAPAN on Jun. 5, 2003, the entire contents of which are hereby incorporated by reference.

BACKGROUND OF THE INVENTION

1. Field of the Invention

The present invention relates to a valve equipped with a check valve mechanism for preventing backflow of a fluid.

2. Description of the Related Art

In equipment in which a fluid is used, a valve equipped with a check valve mechanism is used to prevent backflow of the fluid. For instance, many of feed water pipings used in water piping systems such as boilers are provided with a valve equipped with a check valve mechanism for preventing backflow of feed water or boiler water. Boiler water has a high pressure and a high temperature, and it is therefore necessary, from the viewpoint of safety and the heatproof temperature of the pre-treatment equipment, that all possible countermeasures be taken against the backflow of the boiler water. To that end, it is necessary to take all possible measures to prevent leakage through the check valve (hereinafter also referred to as "check valve leakage"), that is, to prevent backflow.

As an example of such a valve with a check valve mechanism, there is known one including a check valve mechanism equipped within a valve chamber defined between a fluid inlet and a fluid outlet of a valve casing. The check valve mechanism includes a valve seat having a valve hole formed therein, and a valve body fixed to a valve shaft and arranged on the fluid outlet side of the valve seat, the valve shaft passing through the valve hole of the valve seat and being movably supported on the fluid inlet and outlet sides of the valve seat; when applied with a fluid pressure acting in the direction from the fluid inlet side to the fluid outlet side, the valve body moves away from the valve seat to thereby open the valve hole, and when applied with a fluid pressure acting in the direction from the fluid outlet side to the fluid inlet side, the valve body moves toward and into abutment with the valve seat, thus closing the valve hole (for example, see JP 07-101066 B).

With the valve equipped with a check valve mechanism as disclosed in JP 07-101066 B mentioned above, however, clogging of refuse between the valve seat and the valve body, deformation of the valve body, or the like may impair the sealing property of the check valve mechanism, leading to check valve leakage, that is, occurrence of fluid backflow. In view of this, as a measure for preventing fluid backflow, a construction has been employed in which a plurality of valves with a check valve mechanism are connected in series in the piping. However, this construction, in which a plurality of valves with a check valve mechanism are connected in series in the piping, results in increased piping length and an increase in the space required for accommodating such enlarged piping, and also requires rather complicated connection arrangement, leading to an inevitable increase in cost.

SUMMARY OF THE INVENTION

An object of the present invention is to provide a valve with a check valve mechanism capable of reliably preventing fluid backflow.

To attain the above objects, according to an aspect of the present invention, there is provided a valve including: a valve casing; a valve chamber defined between a fluid inlet and a fluid outlet of the valve casing: and a plurality of check valve mechanisms arranged in series within the valve chamber, the plurality of check valve mechanisms each including: a valve seat having a valve hole formed therein: and a valve body fixed to a valve shaft and arranged on a fluid outlet side of the valve seat, the valve shaft passing through the valve hole of the valve seat and movably supported on a fluid inlet side and the fluid outlet side of the valve seat, the valve body being adapted to move away from the valve seat to open the valve hole when applied with a fluid pressure acting in a direction from the fluid inlet side to the fluid outlet side and adapted to move toward and into contact the valve seat to close the valve hole when applied with a fluid pressure acting in a direction from the fluid outlet side to the fluid inlet side.

With the above construction, the plurality of the check valve mechanisms are arranged in series within the valve chamber, whereby backflow of a fluid from the fluid outlet side is prevented by means of the plurality of serially arranged check valve mechanisms, making it possible to reliably prevent fluid backflow. Further, the plurality of check valve mechanisms are provided within the valve chamber defined between the fluid inlet and the fluid outlet of the valve casing, whereby the connecting thereof to the piping is a fast one connection process. Therefore, the connection process is far simpler as compared with the conventional process in which a plurality of valves with a check valve mechanism are connected in series to the piping. As for the size of the valve of the present invention, the valve casing may simply be enlarged with increasing number of the check valve mechanisms provided. Therefore, as compared with the conventional arrangement in which a plurality of valves with a check valve mechanism are connected in series to the piping, neither a large piping length nor a large space is required for effecting the connection.

According to another aspect of the present invention, the valve casing includes: a tubular inflow passage member having the fluid inlet; a tubular outflow passage member having the fluid outlet; and a tubular valve chamber member arranged between the tubular inflow passage member and the tubular outflow passage member and constituting the valve chamber between the tubular inflow passage member and the tubular outflow passage member, the tubular valve chamber member having one of male and female thread portions formed on one side thereof and the other of male and female thread portions formed on the other side thereof, with the tubular inflow passage member being threadedly attached to the one side of the tubular valve chamber member and the tubular outflow passage member being threadedly attached to the other side of the tubular valve chamber member to form the valve casing, the tubular inflow passage member and the tubular valve chamber member each include a first valve shaft support portion and the valve seat constituting each the check valve mechanism, the first valve shaft support portion movably supporting the valve shaft to which the valve body constituting each the check valve mechanism is fixed, and the tubular outflow passage member includes a second valve shaft support portion that movably supports the valve shaft.

With the above construction, the valve can be assembled through the following simple process of: threadedly attaching the tubular valve chamber member and the tubular inflow passage member to each other, with the fluid inlet side end portion of the valve shaft fixedly supporting the valve body being supported to the valve shaft support portion provided in the tubular inflow passage member and with the fluid outlet side end portion thereof being supported to the valve shaft support portion provided in the tubular valve chamber member; and threadedly attaching the tubular valve chamber member and the tubular outflow passage member to each other, with the fluid inlet side end portion of the valve shaft that fixedly supports another valve body being supported to the valve shaft support portion provided in the tubular valve chamber member and with the fluid outlet side end portion thereof being supported to the valve shaft support portion provided in the tubular outflow passage member. Therefore, the manufacture and maintenance of the valve are easy.

According to another aspect of the present invention, the one of the male thread portion and the female thread portion formed on the one side of the tubular valve chamber member and the other of the male thread portion and the female thread portion formed on the other side of the tubular valve chamber member are each formed to have a thread diameter that allows threaded engagement between the male thread portion and the female thread portion.

With the above construction, when there are prepared a plurality of the tubular valve chamber members and a plurality of the valve bodies fixedly supported to the valve shaft, an arrangement is possible in which another tubular valve chamber member is added to one tubular valve chamber member through threaded attachment, and the valve body fixedly supported to the valve shaft is placed between one tubular valve chamber member and another tubular valve chamber member, thus allowing the valve shaft to be supported to the valve shaft support portion of one tubular valve chamber member and to the valve shaft support portion of another tubular valve chamber member. Therefore, by adding the tubular valve chamber members successively as required, a desired number of check valve mechanisms can be readily provided within the valve chamber.

According to another aspect of the present invention, of the valve shafts to each of which the valve body constituting each the check valve mechanism is fixed, a fluid outlet side end portion of the valve shaft to which the valve body constituting one check valve mechanism is fixed and a fluid inlet side end portion of the valve shaft to which the valve body constituting another check valve mechanism is fixed are capable of fitting engagement with each other so as to be axially slidable relative to each other.

With the above construction, the respective fluid inlet side end portions of the valve shafts that fixedly support the valve bodies arranged in series are each supported to the valve shaft support portion and, except for the valve shaft that fixedly supports the valve body situated on the furthermost fluid outlet side, the fluid outlet side end portion of each valve shaft fixedly supporting another valve body is fitted into the fluid inlet side end portion of the valve shaft supported to the valve shaft support portion, whereby the fluid outlet side end portion of the valve shaft is supported, so as to be axially slidable, by the fluid inlet side end portion of another valve shaft supported to the valve shaft support portion. Accordingly, the valve shaft support portion provided in the tubular valve chamber member needs to support only the fluid inlet side end portion of the valve shaft, and no additional structure is required to support the fluid outlet side end portion of the valve shaft, making it possible to achieve a simplified construction and overall size and cost reductions.

According to another aspect of the present invention, each valve shaft to which the valve body is fixed is urged by a spring toward the fluid inlet side to bring each valve body into abutment with the valve seat by an elastic force of the spring.

With the above construction, the requisite fluid pressure for effecting valve opening can be obtained from the elastic force of the spring.

According to another aspect of the present invention, the valve casing includes: a tubular inflow passage member having the fluid inlet; a tubular outflow passage member having the fluid outlet; and a tubular valve chamber member arranged between the tubular inflow passage member and the tubular outflow passage member and constituting the valve chamber between the tubular inflow passage member and the tubular outflow passage member, the tubular valve chamber member having one of male and female thread portions formed on one side thereof and the other of male and female thread portions formed on the other side thereof, with the tubular inflow passage member being threadedly attached to the one side of the tubular valve chamber member and the tubular outflow passage member being threadedly attached to the other side of the tubular valve chamber member to form the valve casing, the valve further includes a first valve shaft support portion and the valve seat constituting the check valve mechanism which are sandwiched and supported between the tubular valve chamber member and the tubular inflow passage member and between the tubular valve chamber member and the tubular outflow passage member, the first valve shaft support portion movably supporting the valve shaft to which the valve body constituting the check valve mechanism is fixed, and the tubular outflow passage member includes a second valve shaft support portion that movably supports the valve shaft.

With the above construction, the valve can be assembled through the following simple process. That is, the tubular valve chamber member and the tubular inflow passage member are threadedly attached to each other such that the valve shaft support portion and the valve seat are sandwiched and supported therebetween, with the fluid inlet side end portion of the valve shaft that fixedly supports the valve body being supported to the above valve shaft support portion; and another tubular valve chamber member and another tubular inflow passage member are threadedly attached to each other such that the valve shaft support portion and the valve seat are sandwiched and supported therebetween, and the fluid outlet side end portion of the above valve shaft is supported to the valve shaft support portion that is sandwiched and held between the above another tubular valve chamber member and the above another tubular inflow passage member, with the fluid inlet side end portion of the valve shaft that fixedly supports another valve shaft being also supported to the above valve shaft support portion and the fluid outlet side of that valve shaft being supported to the valve shaft support portion provided in the tubular outflow passage member, thereby threadedly attaching the tubular valve chamber member and the tubular outflow passage member to each other. Therefore, the manufacture and maintenance of the valve are easy.

According to another aspect of the present invention, the one of the male thread portion and the female thread portion formed on the one side of the tubular valve chamber member and the other of the male thread portion and the female thread portion formed on the other side of the tubular valve chamber member are each formed to have a thread diameter that allows threaded engagement between the male thread portion and the female thread portion, and upon threaded attachment of one tubular valve chamber member and another tubular valve chamber member to each other, the valve shaft support portion, which movably supports the valve shaft to which the valve body constituting each the check valve mechanism is fixed, and the valve seat constituting each the check valve mechanism are capable of being sandwiched and supported also between the one tubular valve chamber member and the other tubular valve chamber member.

With the above construction, when there are prepared a plurality of: the tubular valve chamber members; the valve shaft support portions; the valve seats; and the valve bodies fixed to the valve shaft, an arrangement is possible in which another tubular valve chamber member is added to one tubular valve chamber member through threaded attachment such that the valve shaft support portion and the valve seat are sandwiched and supported between those tubular valve chamber members, and the valve body fixedly supported to the valve shaft is placed between one tubular valve chamber member and another tubular valve chamber member, thus allowing the valve shaft to be supported to the valve shaft support portion of one tubular valve chamber member and to the valve shaft support portion of another tubular valve chamber member. Therefore, by adding the tubular valve chamber members successively as required, a desired number of check valve mechanisms can be readily provided within the valve chamber.

According to another aspect of the present invention, of the valve shafts to each of which the valve body constituting each the check valve mechanism is fixed, a fluid outlet side end portion of the valve shaft to which the valve body constituting one check valve mechanism is fixed and a fluid inlet side end portion of the valve shaft to which the valve body constituting another check valve mechanism is fixed are capable of fitting engagement with each other so as to be axially slidable relative to each other.

With the above construction, the respective fluid inlet side end portions of the valve shafts that fixedly support the valve bodies arranged in series are each supported to the valve shaft support portion and, except for the valve shaft that fixedly supports the valve body situated on the furthermost fluid outlet side, the fluid outlet side end portion of each valve shaft fixedly supporting another valve body is fitted into the fluid inlet side end portion of the valve shaft supported to the valve shaft support portion, whereby the fluid outlet side end portion of the valve shaft is supported, so as to be axially slidable, by the fluid inlet side end portion of another valve shaft supported to the valve shaft support portion. Accordingly, the valve shaft support portion provided in the tubular valve chamber member needs to support only the fluid inlet side end portion of the valve shaft, and no additional structure is required to support the fluid outlet side end portion of the valve shaft, making it possible to achieve a simplified construction and overall size and cost reductions.

According to another aspect of the present invention, each valve shaft to which the valve body is fixed is urged by a spring toward the fluid inlet side to bring each valve body into abutment with the valve seat by an elastic force of the spring.

With the above construction, the requisite fluid pressure for effecting valve opening can be obtained from the elastic force of the spring.

BRIEF DESCRIPTION OF THE DRAWINGS

In the accompanying drawings:
FIG. 5 is an explanatory diagram illustrating how valve shafts each having a valve body fixed thereto are supported to each other.

DETAILED DESCRIPTION OF THE PREFERRED EMBODIMENTS

Figure 1:
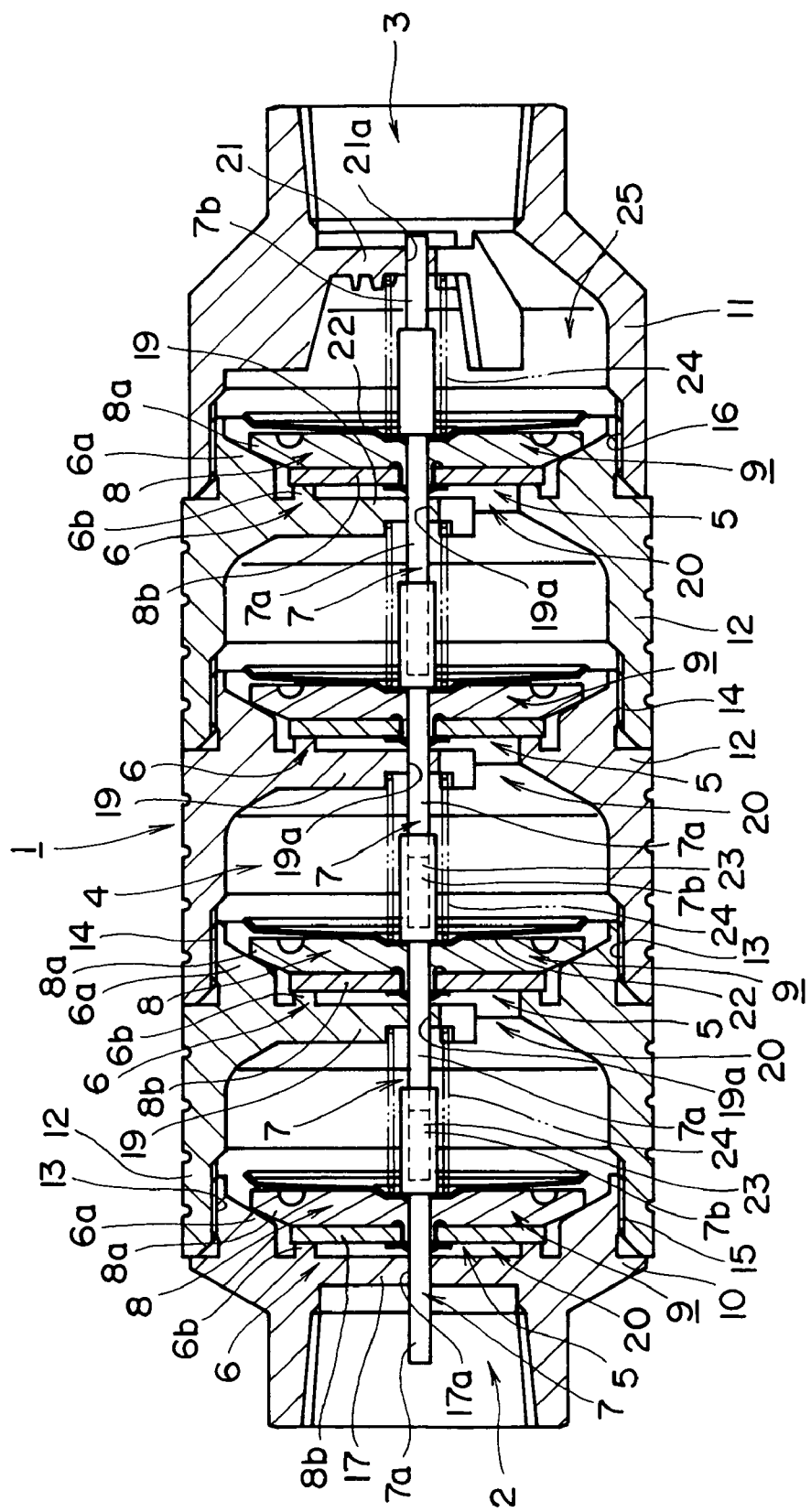
FIG. 1 is a longitudinal sectional view showing a valve according to a first embodiment of the present invention.
Figure 2:
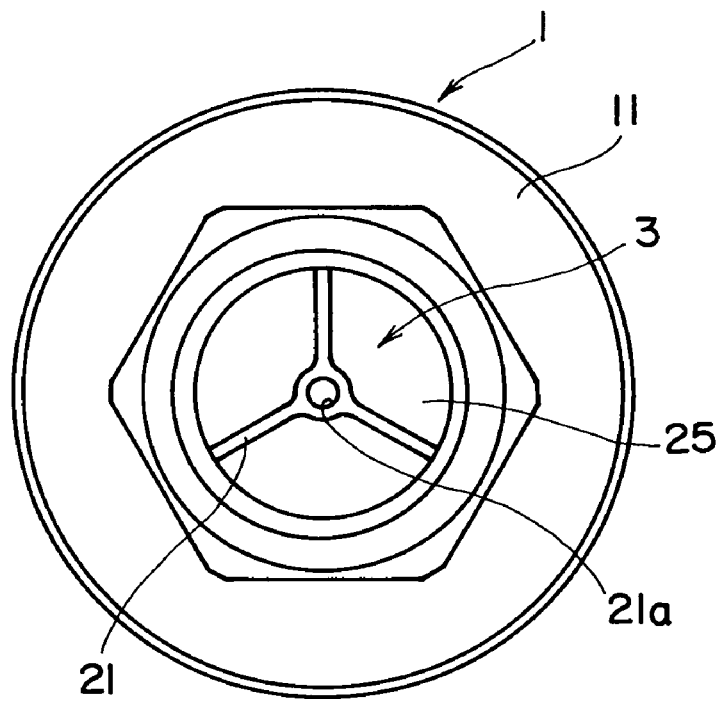
FIG. 2 is a right-hand side view of FIG. 1.
Figure 3:
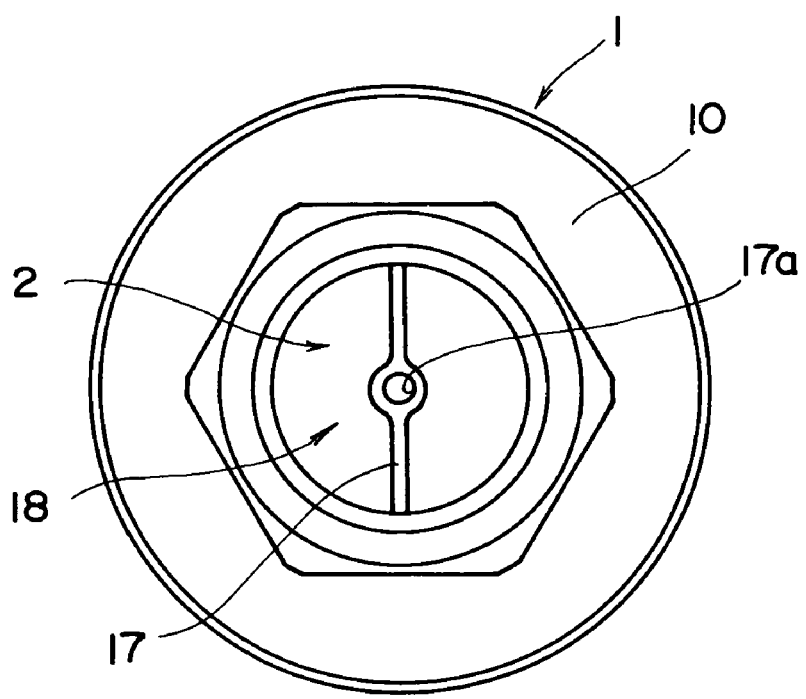
FIG. 3 is a left-hand side view of FIG. 1.
Figure 4:
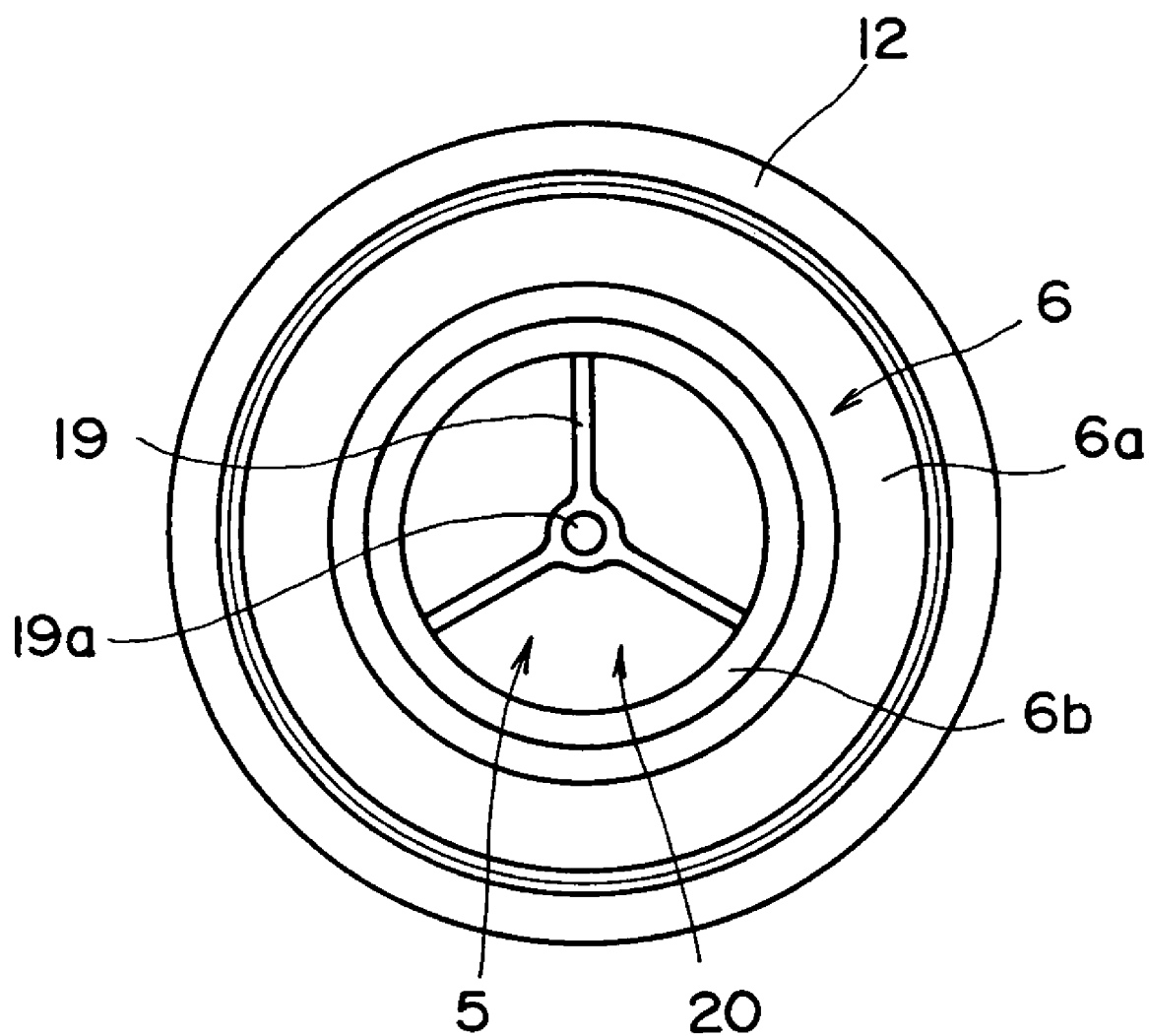
FIG. 4 is a right-hand side view of a tubular valve chamber member.

FIGS. 1 through 5 show a valve according to a first embodiment of the present invention. As shown in the figures, in the valve of this embodiment, a valve chamber 4 is defined between a fluid inlet 2 and a fluid outlet 3 of a valve casing 1. A plurality of check valve mechanisms 9 are arranged in series within the valve chamber 4. The check valve mechanism 9 is composed of a valve seat 6 equipped with a valve hole 5 for the valve chamber 4, and a valve body 8 fixed to a valve shaft 7 and arranged on the fluid outlet 3 side of the valve seat 6, the valve shaft 7 being movably supported on the fluid inlet 2 and fluid outlet 3 sides of the valve seat 6 while passing through the valve hole 5 of the valve seat 6. When applied with a fluid pressure acting in the direction from the fluid inlet 2 side to the fluid outlet 3 side, the valve body 8 moves away from the valve seat 6 to thereby open the valve hole 5, and when applied with a fluid pressure acting in the direction from the fluid outlet 3 side to the fluid inlet 2 side, the valve body 8 moves toward and into abutment with the valve seat 6, thereby closing the valve hole 5.

The valve casing 1 is composed of a tubular inflow passage member 10 having the fluid inlet 2 and serving as a piping connection portion on the inflow side, a tubular outflow passage member 11 having the fluid outlet 3 and serving as a piping connection portion on the outflow passage side, and a tubular valve chamber member 12 arranged between the tubular inflow passage member 10 and the tubular outflow passage member 11 and constituting the valve chamber 4 between the tubular inflow passage member 10 and the tubular outflow passage member 11.

A female thread portion 13 and a male thread portion 14 are formed on the fluid inlet 2 side and the fluid outlet 3 side of the tubular valve chamber member 12, respectively. Formed in the tubular inflow passage member 10 is a male thread portion 15 that threadedly engages with the female thread portion 13 of the tubular valve chamber member 12, and formed in the tubular outflow passage member 11 is a female thread portion 16 that threadedly engages with the male thread portion 14 of the tubular valve chamber member 12. The tubular inflow passage member 10 is threadedly attached onto the fluid inlet 2 side of the tubular valve chamber member 12 and the tubular outflow passage member 11 is threadedly attached onto the fluid outlet 3 side of the tubular valve chamber member 12, thus forming the valve casing 1. Although not shown, a sealing member is provided in each of the threaded attachment portions mentioned above.

The female thread portion 13 and the male thread portion 14 of the tubular valve chamber member 12 are formed to have such thread diameters as to allow threaded engagement between the female thread portion 13 and the male thread portion 14. Thus, by preparing a plurality of the tubular valve chamber members 12, another tubular valve chamber member 12 may be threadedly attached to one tubular valve chamber member 12, thus adding the tubular valve chamber members 12 successively as required.

The tubular inflow passage member 10 is provided with a valve shaft support portion 17 for movably supporting a fluid inlet side end portion 7a of the valve shaft 7 to which the valve body 8 constituting the check valve mechanism 9 is fixed, and the valve seat 6 constituting the check valve mechanism 9. Formed in the valve shaft support portion 17 are a valve shaft insertion hole 17a into which the fluid inlet side end portion 7a of the valve shaft 7 is inserted, and a hole 18 allowing passage of a fluid. The valve seat 6 is composed of a first valve seat portion 6a and a second valve seat portion 6b.

As in the tubular inflow passage member 10, the tubular valve chamber member 12 is likewise provided with a valve shaft support portion 19 movably supporting the fluid inlet side end portion 7a of the valve shaft 7 to which the valve body 8 constituting the check valve mechanism 9 is fixed, and the valve seat 6 constituting the check valve mechanism 9. The valve body 6 provided in the tubular valve chamber member 12 and the valve body 6 provided in the tubular inflow passage member 10 are of completely the same construction. Formed in the valve shaft support portion 19 are a valve shaft insertion hole 19a into which the fluid inlet side end portion 7a of the valve shaft 7 is inserted, and a hole 20 allowing passage of a fluid.

Further, the tubular outflow passage member 11 is provided with a valve shaft support portion 21 movably supporting a fluid outlet side end portion 7b of the valve shaft 7. Formed in the valve shaft support portion 21 are a valve shaft insertion hole 21a into which the fluid outlet side end portion 7b of the valve shaft 7 is inserted, and a hole 25 allowing passage of a fluid.

The valve body 8 fixed to the valve shaft 7 is composed of an elastic valve body portion 8a formed of an elastic material such as rubber and adapted to abut the first valve seat portion 6a, and an inelastic valve body portion 8b formed of an inelastic material such as metal, the inelastic valve body portion 8b being overlapped on the fluid inlet 2 side surface of the elastic valve body portion 8a and being smaller in diameter than the elastic valve body portion 8a. The valve body 8 is fixed to the valve shaft 7 with the valve shaft 7 passing through the center of the valve body 8, allowing the valve body 8 to move integrally with the valve shaft 7 into contact with or away from the valve seat 6.

Further, a valve body abutment plate 22 is fixed to the valve shaft 7 with the valve shaft 7 passing through the center of the valve body abutment plate 22. The valve body abutment plate 22 is arranged on the fluid outlet 3 side of the elastic valve body portion 8a and adapted to abut and support the elastic valve body portion 8a.

In the valve shaft 7, the fluid outlet side end portion 7b of the valve shaft 7 fixedly supporting the valve body 8 that constitutes one check valve mechanism 9, and the fluid inlet side end portion 7a of the valve shaft 7 fixedly supporting the valve body 8 that constitutes another check valve mechanism 9 are capable of fitting engagement with each other so as to be axially slidable relative to each other. In this embodiment, a tube portion 23 is formed in the fluid outlet side end portion 7b of the valve shaft 7, and the fluid inlet side end portion 7a of another valve shaft 7 can be slidably fitted into the tube portion 23.

Further, in this embodiment, interposed between the valve body abutment plate 22 and each of the valve shaft support portions 19 and 21 present on the fluid outlet 3 side of the valve body abutment plate 22 is a spring 24 for urging the valve body 8 into abutment with the valve seat 6 through the valve body abutment plate 22.

With the valve of this embodiment constructed as described above, the plurality of the check valve mechanisms 9 are arranged in series within the valve chamber 4, whereby backflow of a fluid from the fluid outlet 3 side is prevented by means of the plurality of serially arranged check valve mechanisms 9, making it possible to reliably prevent fluid backflow. Further, the plurality of check valve mechanisms 9 are provided within the valve chamber 4 defined between the fluid inlet 2 and the fluid outlet 3 of the valve casing 1, whereby the connecting thereof to the piping is a fast one connection process. Therefore, the connection process is far simpler as compared with the conventional process in which a plurality of valves with a check valve mechanism are connected in series to the piping. As for the size of the valve of this embodiment, the valve casing 1 may simply be enlarged with increasing number of the check valve mechanisms 9 provided. Therefore, as compared with the conventional arrangement in which a plurality of valves with a check valve mechanism are connected in series to the piping, neither a large piping length nor a large space is required for effecting the connection.

Further, the valve of this embodiment can be assembled through the following simple process. That is, the fluid inlet side end portion 7a of the valve shaft 7 fixedly supporting the valve body 8 is supported to the valve shaft support portion 17 provided in the tubular inflow passage member 10, and the fluid inlet side end portion 7a of the valve shaft 7 that fixedly supports another valve body 8 is supported to the valve shaft support portion 19 provided in the tubular valve chamber member 12 and is fitted into the tube portion 23 formed in the fluid outlet side end portion 7b of the valve shaft 7, thereby threadedly attaching the tubular valve chamber member 12 and the tubular inflow passage member 10 to each other; the fluid outlet side end portion 7b of the valve shaft 7 that fixedly supports another valve body 8 is supported to the valve shaft support portion 21 provided in the tubular outflow passage member 11, thereby achieving threaded attachment of the tubular valve chamber member 12 and the tubular outflow passage member 11 with each other. Therefore, the manufacture and maintenance of the valve are easy.

Furthermore, except for the valve shaft 7 that fixedly supports the valve body 8 situated on the furthermost fluid outlet 3 side, the fluid outlet side end portion 7b of the valve shaft 7 fixedly supporting another valve body 8 is slidably supported in place by fitting the fluid inlet side end portion 7a of another valve shaft 7, which is supported to the valve shaft support portion 19 of the tubular valve chamber member 12, into the tube portion 23 formed in the fluid outlet side end portion 7b. Accordingly, the valve shaft support portion 19 provided in the tubular valve chamber member 12 needs to support only the fluid inlet side end portion 7a of another valve shaft 7, and no additional structure is required to support the fluid outlet side end portion 7b of the valve shaft 7, making it possible to achieve a simplified construction and overall size and cost reductions.

Further, the female thread portion 13 and the male thread portion 14 of the tubular valve chamber member 12 are formed to have such thread diameters as to allow threaded engagement between the female thread portion 13 and the male thread portion 14, whereby another tubular valve chamber member 12 can be added to one tubular valve chamber member 12 through threaded attachment. Accordingly, when there are prepared a plurality of the tubular valve chamber members 12 and a plurality of the valve bodies 8 fixedly supporting the valve shaft 7, an arrangement is possible in which another tubular valve chamber member 12 is added to one tubular valve chamber member 12 through threaded attachment, and the valve body 8 fixedly supporting the valve shaft 7 is placed between one tubular valve chamber member 12 and another tubular valve chamber member 12, thus allowing the fluid inlet side end portion 7a of the valve shaft 7 to be supported to the valve shaft support portion 19 of one tubular valve chamber member 12 and to the valve shaft support portion 19 of another tubular valve chamber member 12. Therefore, by adding the tubular valve chamber members 12 successively as required, a desired number of check valve mechanisms 9 can be readily provided within the valve chamber 4.

Further, in this embodiment, the spring 24 for urging the valve body 8 into abutment with the valve seat 6 through the valve body abutment plate 22 is interposed between the valve body abutment plate 22 fixed to the valve shaft 7 and each of the valve shaft support portions 19 and 21 present on the fluid outlet 3 side of the valve body abutment plate 22, whereby the requisite fluid pressure for effecting valve opening can be obtained from the elastic force of the spring 24.

Figure 6:
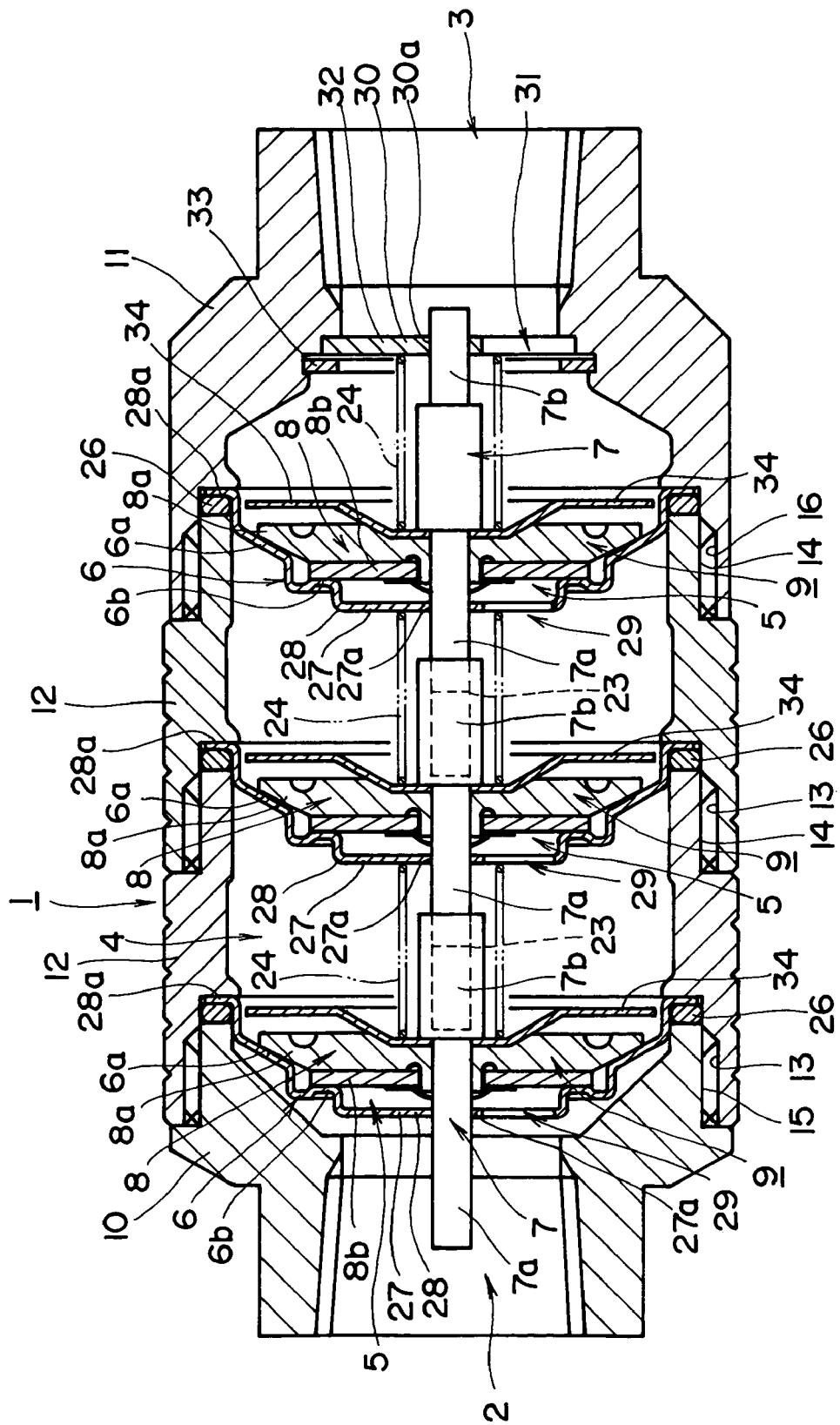
FIG. 6 is a longitudinal sectional view showing a valve according to a second embodiment of the present invention.
Figure 7:
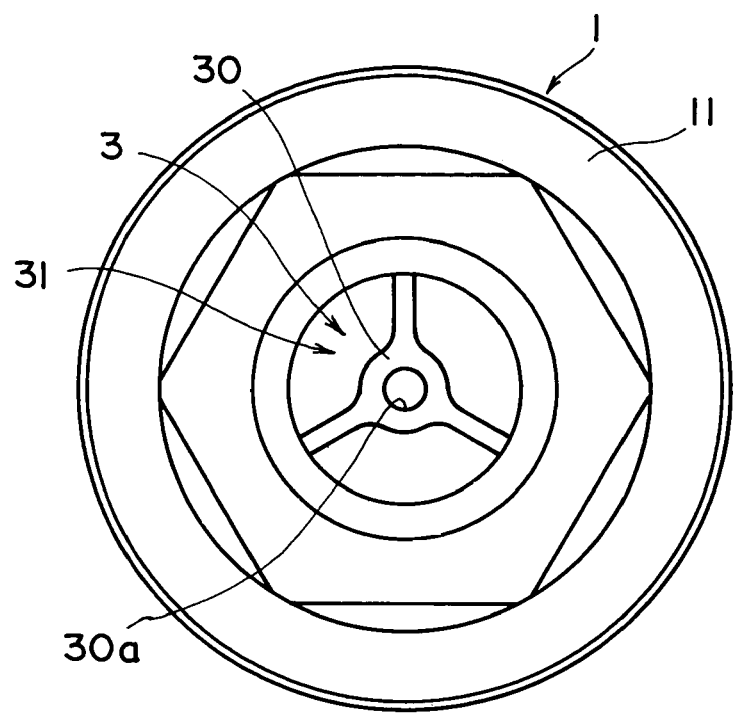
FIG. 7 is a right-hand side view of FIG. 6.
Figure 8:
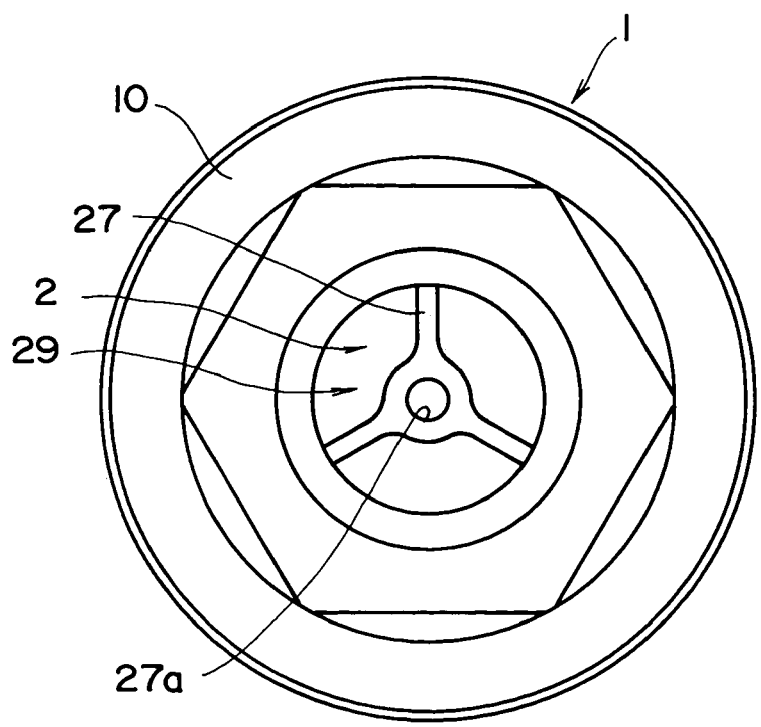
FIG. 8 is a left-hand side view of FIG. 6.

FIGS. 6 though 8 show a valve according to a second embodiment of the present invention. In the figures illustrating the second embodiment, the same components as those of the first embodiment are denoted by the same reference numbers as those of the first embodiment and a detailed description thereof is omitted.

As in the first embodiment, the valve of this embodiment has the valve chamber 4 defined between the fluid inlet 2 and the fluid outlet 3 of the valve casing 1, with the plurality of check valve mechanisms 9 being arranged in series within the valve chamber 4. Each check valve mechanism 9 is composed of the valve seat 6 equipped with the valve hole 5 for the valve chamber 4, and the valve body 8 fixed to the valve shaft 7 and arranged on the fluid outlet 3 side of the valve seat 6, the valve shaft 7 being movably supported on the fluid inlet 2 and fluid outlet 3 sides of the valve seat 6 while passing through the valve hole 5 of the valve seat 6. When applied with a fluid pressure acting in the direction from the fluid inlet 2 side to the fluid outlet 3 side, the valve body 8 moves away from the valve seat 6 to thereby open the valve hole 5, and when applied with a fluid pressure acting in the direction from the fluid outlet 3 side to the fluid inlet 2 side, the valve body 8 moves toward and into abutment with the valve seat 6, thereby closing the valve hole 5.

Likewise, as in the first embodiment, the valve casing 1 is composed of the tubular inflow passage member 10, the tubular outflow passage member 11, and the tubular valve chamber member 12, with the tubular inflow passage member 10 being threadedly attached onto the fluid inlet 2 side of the tubular valve chamber member 12 and the tubular outflow passage member 11 being threadedly attached onto the fluid outlet 3 side of the tubular valve chamber member 12, thereby forming the valve casing 1. A sealing member 26 is provided in each of the threaded attachment portions mentioned above.

In this embodiment as well, the female thread portion 13 and the male thread portion 14 of the tubular valve chamber member 12 are formed to have such thread diameters as to allow threaded engagement between the female thread portion 13 and the male thread portion 14. Thus, by preparing a plurality of the tubular valve chamber members 12, another tubular valve chamber member 12 may be added to one tubular valve chamber member 12 through threaded attachment.

In this embodiment, a valve shaft support portion 27 and the valve seat 6 constituting the check valve mechanism 9 are sandwiched and supported between the tubular valve chamber member 12 and the tubular inflow passage member 10, between the tubular valve chamber member 12 and the tubular outflow passage member 11, and between the tubular valve chamber member 12 and the added adjacent tubular valve chamber member 12, the valve shaft support portion 27 movably supporting the valve shaft 7 that fixedly supports each valve body 8 constituting the check valve mechanism 9.

The valve shaft support portion 27 and the valve seat 6 are formed on a single disc 28 by press working the disc 28, and an outer peripheral portion 28a of the disc 28 in which the valve shaft support portion 27 and the valve seat 6 are formed is sandwiched and supported between the tubular valve chamber member 12 and the tubular inflow passage member 10, between the tubular valve chamber member 12 and the tubular outflow passage member 11, and between the tubular valve chamber member 12 and the added adjacent tubular valve chamber member 12. Formed in the valve shaft support portion 27 are a valve shaft insertion hole 27a into which the fluid inlet side end portion 7a of the valve shaft 7 is inserted, and a hole 29 allowing passage of a fluid.

Further, the tubular outflow passage member 11 is provided with a valve shaft support portion 30 that movably supports the fluid outlet side end portion 7b of the valve shaft 7. Formed in the valve shaft support portion 30 are a valve shaft insertion hole 30a into which the fluid outlet side end portion 7b of the valve shaft 7 is inserted, and a hole 31 allowing passage of a fluid. The valve shaft support portion 30 is formed by press working of a disc 32 and fixed to the tubular outflow passage member 11 with a snap ring 33.

Further, a valve body movement promoting plate 34 is fixed to the valve shaft 7 that fixedly supports the valve body 8, with the valve shaft 7 passing through the center of the valve body movement promoting plate 34. The valve body movement promoting plate 34 is arranged on the fluid outlet 3 side of the elastic valve body portion 8a and adapted to abut and support the elastic valve body portion 8a.

Further, in the valve shaft 7, as in the first embodiment, the fluid inlet side end portion 7a of the valve shaft 7 that fixedly supports another valve body 8 constituting the check valve mechanism 9 can be slidably fitted into the tube portion 23 formed in the fluid outlet side end portion 7b of the valve shaft 7 that fixedly supports one valve body 8 constituting the check valve mechanism 9.

Further, in this embodiment as well, the spring 24 for urging the valve body 8 into abutment with the valve seat 6 through the valve body movement promoting plate 34 is provided between the valve body movement promoting plate 34 and each of the valve shaft support portions 27 and 30 present on the fluid outlet 3 side of the valve body movement promoting plate 34.

With the valve of this embodiment constructed as described above, as in the first embodiment, the plurality of the check valve mechanisms 9 are arranged in series within the valve chamber 4, whereby backflow of a fluid from the fluid outlet 3 side is prevented by means of the plurality of serially arranged check valve mechanisms 9, making it possible to reliably prevent fluid backflow. Further, the plurality of check valve mechanisms 9 are provided within the valve chamber 4 defined between the fluid inlet 2 and the fluid outlet 3 of the valve casing 1. As compared with the conventional arrangement in which a plurality of valves with a check valve mechanism are connected in series to the piping, neither a large piping length nor a large space is required for effecting the connection.

Further, the valve of this embodiment can be assembled by the following simple process. That is, the tubular valve chamber member 12 and the tubular inflow passage member 10 are threadedly attached to each other so as to sandwich and support therebetween the disc 28 in which the valve shaft support portion 27 and the valve seat 6 are formed therein; the fluid inlet side end portion 7a of the valve shaft 7 fixedly supporting the valve body 8 is supported to the valve shaft support portion 27; the fluid inlet side end portion 7a of the valve shaft 7 that fixedly supports another valve body 8, the fluid inlet side end portion 7a being supported to the valve shaft support portion 27 formed in the disc 28 sandwiched and supported between the tubular valve chamber member 12 and the tubular outflow passage member 11 that are threadedly attached to each other, is fitted into the tube portion 23 formed in the fluid outlet side end portion 7b of the valve shaft 7; and the fluid outlet side end portion 7b of the valve shaft 7 that fixedly supports the above another valve body 8 is supported to the valve shaft support portion 30 provided in the tubular outflow passage member 11. Therefore, the manufacture and maintenance of the valve are easy.

Further, also in this embodiment, except for the valve shaft 7 that fixedly supports the valve body 8 situated on the furthermost fluid outlet 3 side, the fluid outlet side end portion 7b of the valve shaft 7 fixedly supporting another valve body 8 is slidably supported in place by fitting the fluid inlet side end portion 7a of another valve shaft 7, which is supported to the valve shaft support portion 27, into the tube portion 23 formed in the fluid outlet side end portion 7b. Accordingly, the valve shaft support portion 27 needs to support only the fluid inlet side end portion 7a of the another valve shaft 7, and no additional structure is required to support the fluid outlet side end portion 7b of the valve shaft 7, making it possible to achieve a simplified construction and overall size and cost reductions.

Further, the female thread portion 13 and the male thread portion 14 of the tubular valve chamber member 12 are formed to have such thread diameters as to allow their threaded engagement, whereby another tubular valve chamber member 12 may be added to one tubular valve chamber member 12 through threaded attachment. Hence, when there are prepared a plurality of: the tubular valve chamber members 12; the discs 28 each having the valve shaft support portion 27 and the valve seat 6 formed therein; and the valve bodies 8 fixed to the valve shaft 7, an arrangement is possible in which another tubular valve chamber member 12 is added to one tubular valve chamber member 12 through threaded attachment while the disc 28 having the valve shaft support portion 27 and the valve seat 6 formed therein is sandwiched and supported between those tubular valve chamber members 12, and the valve body 8 fixedly supporting the valve shaft 7 is placed between one tubular valve chamber member 12 and another tubular valve chamber member 12, thus allowing the fluid inlet side end portion 7a of the valve shaft 7 to be supported to the valve shaft support portion 27 of one tubular valve chamber member 12 and to the valve shaft support portion 27 of another tubular valve chamber member 12. Therefore, by adding the tubular valve chamber members 12 successively as required, a desired number of check valve mechanisms 9 can be readily provided within the valve chamber 4.

Further, also in this embodiment, the spring 24 for urging the valve body 8 into abutment with the valve seat 6 through the valve body movement promoting plate 34 is interposed between the valve body movement promoting plate 34 and each of the valve shaft support portions 27 and 30 present on the fluid outlet 3 side of the valve body movement promoting plate 34, whereby the requisite fluid pressure for effecting valve opening can be obtained from the elastic force of the spring 24.

As described above, the valve according to the present invention includes the plurality of check valve mechanisms arranged in series within the valve chamber that is defined between the fluid inlet and the fluid outlet of the valve casing, the plurality of check valve mechanisms each including: the valve seat equipped with the valve hole; and the valve body fixed to the valve shaft and arranged on the fluid outlet side of the valve seat, the valve shaft passing through the valve hole of the valve seat and movably supported on the fluid inlet and fluid outlet sides of the valve seat, wherein when applied with a fluid pressure acting in the direction from the fluid inlet side to the fluid outlet side, the valve body moves away from the valve seat to thereby open the valve hole, and when applied with a fluid pressure acting in the direction from the fluid outlet side to the fluid inlet side, the valve body moves toward and into abutment with the valve seat to thereby close the valve hole. As a result, backflow of a fluid from the fluid outlet side is prevented by means of the plurality of serially arranged check valve mechanisms, making it possible to reliably prevent fluid backflow. Further, the plurality of check valve mechanisms are provided within the valve chamber defined between the fluid inlet and the fluid outlet of the valve casing, so that the connecting thereof to the piping is a fast one connection process. Therefore, the connection process is far simpler as compared with the conventional process in which a plurality of valves with a check valve mechanism are connected in series to the piping. As for the size of the valve of the present invention, the valve casing may simply be enlarged with increasing number of the check valve mechanisms provided. Therefore, as compared with the conventional arrangement in which a plurality of valves with a check valve mechanism are connected in series to the piping, neither a large piping length nor a large space is required for effecting the connection.

What is claimed is:
1. A valve comprising:
a valve casing;
a valve chamber defined between a fluid inlet and a fluid outlet of the valve casing; and
a plurality of check valve mechanisms arranged in series within the valve chamber, the plurality of check valve mechanisms each including:
a valve seat having a valve hole formed therein; and
a valve body fixed to a valve shaft and arranged on a fluid outlet side of the valve seat, the valve shaft passing through the valve hole of the valve seat and movably supported on a fluid inlet side and the fluid outlet side of the valve seat, the valve body being adapted to move away from the valve seat to open the valve hole when applied with a fluid pressure acting in a direction from the fluid inlet side to the fluid outlet side and adapted to move toward and into contact with the valve seat to close the valve hole when applied with a fluid pressure acting in a direction from the fluid outlet side to the fluid inlet side;

wherein,
of the valve shafts to each of which the valve body constituting each the check valve mechanism is fixed, a fluid outlet side end portion of the valve shaft to which the valve body constituting one check valve mechanism is fixed and a fluid inlet side end portion of the valve shaft to which the valve body constituting another check valve mechanism is fixed are capable of fitting engagement with each other so as to be axially slidable relative to each other.

2. A valve according to claim 1, wherein
the valve casing includes:
a tubular inflow passage member having the fluid inlet;
a tubular outflow passage member having the fluid outlet; and
a tubular valve chamber member arranged between the tubular inflow passage member and the tubular outflow passage member and constituting the valve chamber between the tubular inflow passage member and the tubular outflow passage member, the tubular valve chamber member having one of male and female thread portions formed on one side thereof and the other of male and female thread portions formed on the other side thereof, with the tubular inflow passage member being threadedly attached to the one side of the tubular valve chamber member and the tubular outflow passage member being threadedly attached to the other side of the tubular valve chamber member to form the valve casing, and
wherein the tubular inflow passage member and the tubular valve chamber member each include a first valve shaft support portion and the valve seat constituting each the check valve mechanism, the first valve shaft support portion movably supporting the valve shaft to which the valve body constituting each the check valve mechanism is fixed, and the tubular outflow passage member includes a second valve shaft support portion that movably supports the valve shaft.

3. A valve according to claim 2, wherein
the one of the male thread portion and the female thread portion formed on the one side of the tubular valve chamber member and the other of the male thread portion and the female thread portion formed on the other side of the tubular valve chamber member are each formed to have a thread diameter that allows threaded engagement between the male thread portion and the female thread portion.

4. A valve according to any one of claims 1 to 3, wherein
each valve shaft to which the valve body is fixed is urged by a spring toward the fluid inlet side to bring each valve body into abutment with the valve seat by an elastic force of the spring.

5. A valve according to claim 1, wherein
the valve casing includes:
a tubular inflow passage member having the fluid inlet;
a tubular outflow passage member having the fluid outlet; and
a tubular valve chamber member arranged between the tubular inflow passage member and the tubular outflow passage member and constituting the valve chamber between the tubular inflow passage member and the tubular outflow passage member,
the tubular valve chamber member having one of male and female thread portions formed on one side thereof and the other of male and female thread portions formed on the other side thereof, with the tubular inflow passage member being threadedly attached to the one side of the tubular valve chamber member and the tubular outflow passage member being threadedly attached to the other side of the tubular valve chamber member to form the valve casing, wherein the valve further comprises a first valve shaft support portion and the valve seat constituting the check valve mechanism which are sandwiched and supported between the tubular valve chamber member and the tubular inflow passage member and between the tubular valve chamber member and the tubular outflow passage member, the first valve shaft support portion movably supporting the valve shaft to which the valve body constituting the check valve mechanism is fixed, and wherein the tubular outflow passage member includes a second valve shaft support portion that movably supports the valve shaft.

6. A valve according to claim 5, wherein
the one of the male thread portion and the female thread portion formed on the one side of the tubular valve chamber member and the other of the male thread portion and the female thread portion formed on the other side of the tubular valve chamber member are each formed to have a thread diameter that allows threaded engagement between the male thread portion and the female thread portion, and
wherein upon threaded attachment of one tubular valve chamber member and another tubular valve chamber member to each other, the valve shaft support portion, which movably supports the valve shaft to which the valve body constituting each the check valve mechanism is fixed, and the valve seat constituting each the check valve mechanism are capable of being sandwiched and supported also between the one tubular valve chamber member and the other tubular valve chamber member.

7. A valve according to claim 5 or 6, wherein each valve shaft to which the valve body is fixed is urged by a spring toward the fluid inlet side to bring each valve body into abutment with the valve seat by an elastic force of the spring.

8. A valve comprising:
a valve casing having a fluid inlet and a fluid outlet;
a valve chamber defined between the fluid inlet and the fluid outlet; and
first and second check valve mechanisms arranged in series within the valve chamber, each check valve mechanism including:
a valve seat having a valve hole formed therein; and
a valve body fixed to a valve shaft and arranged on a fluid outlet side of the valve seat, the valve shaft being movably supported on a fluid inlet side and the fluid outlet side of the valve seat, the valve body being adapted to move away from the valve seat to open the valve hole when applied with a fluid pressure acting in a direction from the fluid inlet side to the fluid outlet side and adapted to move toward and into contact with the valve seat to close the valve hole when applied with a fluid pressure acting in a direction from the fluid outlet side to the fluid inlet side;
wherein,
the fluid outlet side of the first check valve mechanism valve shaft slidingly engages the fluid inlet side of the second check valve mechanism valve shaft so as to be axially slidable relative thereto.

* * * * *